United States Patent [19]

Strope et al.

[11] Patent Number: 4,556,845

[45] Date of Patent: Dec. 3, 1985

[54] METHOD FOR MONITORING DEPOSITION RATE USING AN EDDY CURRENT DETECTOR

[75] Inventors: Douglas H. Strope, Apalachin; Thomas E. Wray, Vestal, both of N.Y.

[73] Assignee: International Business Machines Corporation, Armonk, N.Y.

[21] Appl. No.: 378,697

[22] Filed: May 17, 1982

[51] Int. Cl.⁴ .......................... G01B 7/10; G01R 33/12
[52] U.S. Cl. ........................................ 324/230; 427/10
[58] Field of Search ....................... 324/229, 230, 231; 427/8, 9, 10

[56] References Cited

U.S. PATENT DOCUMENTS

| | | | |
|---|---|---|---|
| 2,916,694 | 3/1956 | Hanysz et al. | 324/34 |
| 3,230,447 | 1/1966 | Cann | 324/222 |
| 3,358,225 | 12/1967 | Peugot | 324/40 |
| 3,773,548 | 11/1973 | Baker et al. | 427/10 |
| 3,775,277 | 11/1973 | Pompei et al. | 204/192 |

FOREIGN PATENT DOCUMENTS 1565789  3/1969  France .

OTHER PUBLICATIONS

Canestaro, "Continuous Monitoring of Plating Bath Plating Rate", IBM Tech. Disclosure Bul. vol. 17, No. 6, pp. 1581-1582, 11/1974.

Primary Examiner—Gerard R. Strecker
Assistant Examiner—Walter E. Snow
Attorney, Agent, or Firm—Marilyn D. Smith; Elmer W. Galbi; J. Jancin, Jr.

[57] ABSTRACT

A conductive film deposition rate monitoring method for measuring the real time deposition rate of a metallic deposition process particularly an electroless plating bath, including the steps of positioning an eddy current detector within a predetermined distance of a test surface where the deposition is to be deposited, and the step of monitoring the output of the detector. The apparatus comprises an eddy current sensor and a non-metallic housing for the sensor, having a non-conductive wall of predetermined thickness between the sensor and the surface of the wall distant from the sensor, the distant wall being immersed in the deposition environment, such as a plating bath, so that a deposit takes place on the distant surface, and measuring means connected to the output of the sensor for measuring the amplitude and rate of change of the output of the sensor.

4 Claims, 4 Drawing Figures

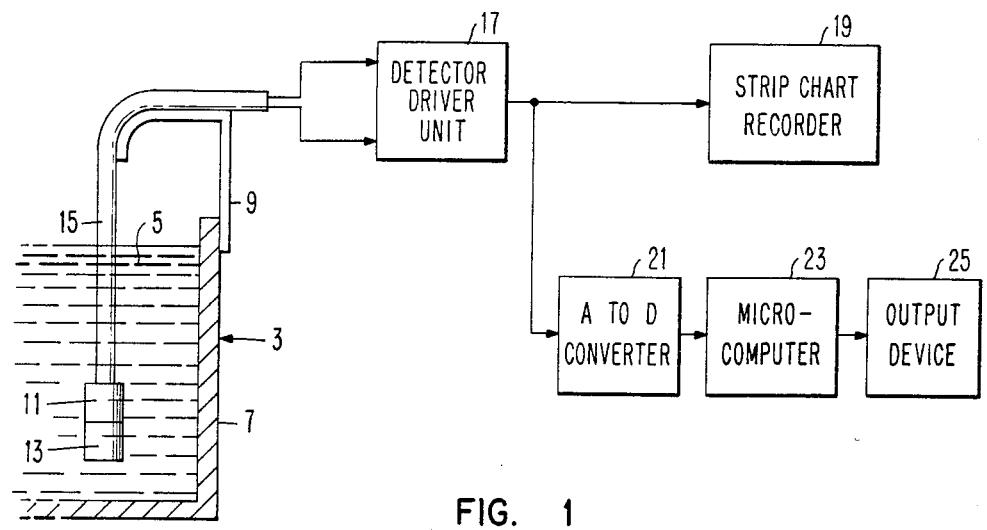
FIG. 1
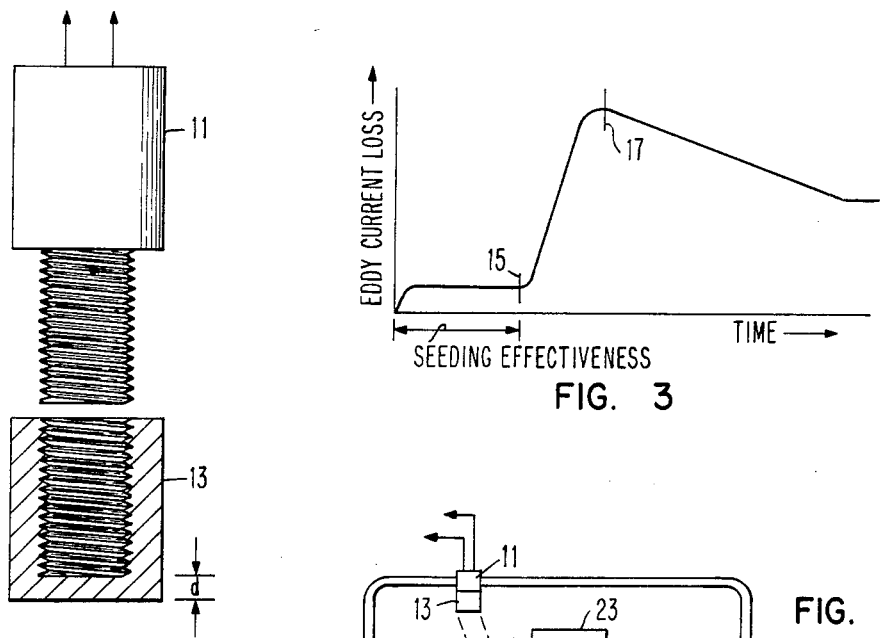
FIG. 2
FIG. 3
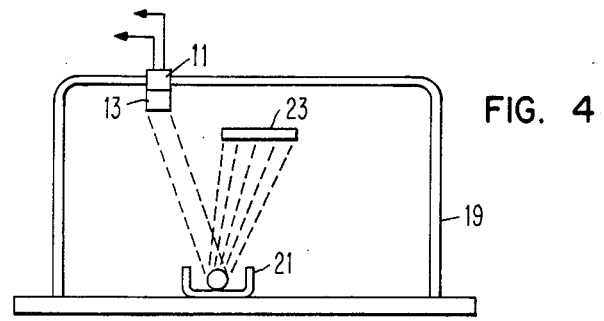
FIG. 4

METHOD FOR MONITORING DEPOSITION RATE USING AN EDDY CURRENT DETECTOR

BACKGROUND OF THE INVENTION

(1) Field of the Invention

This invention relates generally to conductive film deposition rate monitors and more particularly to a method and apparatus for monitoring the deposition rate and thickness of deposition in a metallic deposition environment, particularly in an electroless (non-electrolytic) plating bath.

(2) Description of the Prior Art

Plating thickness measuring devices are known in the art. Such devices are usually employed to determine the thickness of a plating after it has been deposited, i.e., as a post-plating measurement. Also the use of eddy current devices to measure metallic deposition thickness is well known. In electroless plating, there are many varying factors which determine the degree of success to be achieved in the plating operation. One important factor is the rate of plating.

SUMMARY OF THE INVENTION

The present invention provides a deposition rate monitoring method and apparatus which measure the real time deposition rate of a metallic deposition process, particularly an electroless plating bath, including the step of positioning an eddy current detector within a predetermined distance of a test surface where the deposition is to be deposited and the step of monitoring the output of the detector. The apparatus comprises an eddy current sensor and a non-metallic housing or cap for the sensor, having a non-conductive wall of predetermined thickness between the sensor and the surface of the wall distant from the sensor, the distant wall being immersed in the deposition environment, such as a plating bath, so that a deposit takes place on the distant surface, and measuring means connected to the output of the sensor for measuring the amplitude and rate of change of the output of the sensor.

With respect to electroless plating, this invention will provide method and means to test seeding processes and plating initiation.

It is accordingly an object of this invention to provide an improved deposition rate monitoring method and apparatus, particularly suited for electroless plating.

Another object of the invention is to provide an improved plating rate monitor which operates in real time and in the bath itself.

A further object of the invention is to provide an improved plating rate monitor which operates in real time on a continuing basis.

Another object of the invention is to provide improved method and means for testing seeding processes and plating initiation.

The foregoing and other objects features and advantages of the invention will be apparent from the following more particular description of a preferred embodiment of the invention, as illustrated in the accompanying drawings.

BRIEF DESCRIPTION OF THE DRAWINGS

FIG. 1 is a schematic drawing of a deposition rate monitoring apparatus in accordance with the preferred embodiment of the invention.

FIG. 2 is a detailed cross sectional view of a plastic end cap as employed in the arrangement shown in FIG. 1.

FIG. 3 is a graph illustrating the operation of the embodiment shown in FIG. 1.

FIG. 4 shows a deposition rate monitor in a vacuum deposition environment.

Similar reference characters refer to similar parts in each of the several views.

DESCRIPTION OF THE PREFERRED EMBODIMENT

In carrying out the method of conductive plating monitoring according to this invention, an eddy current detector is positioned at a predetermined distance from a surface on which metallic deposition can take place. The assembly is placed in the deposition environment and the output of the detector is monitored with respect to the amplitude and the rate of change of the output, thereby indicating the thickness of the deposition and the rate at which it is being deposited.

A preferred arrangement of apparatus for electroless plating is shown in FIG. 1 of the drawings, in which a plating bath 3 comprises a plating liquid body 5 enclosed in a suitable container, a portion of which container wall is shown at 7. By means of a bracket 9 or other suspension device an eddy current sensing probe 11 is suspended at a suitable distance beneath the surface of the plating bath, for example, of the order of six inches. A liquid proof housing is provided for the sensing element including a cap 13, the details of which will be subsequently explained, and a liquid-proof connecting cable 15 is provided, which also acts as a suspension for the sensor. The output leads from the sensor are supplied to the input of a detector driver unit 17, which will produce an output signal which will have an amplitude and rate of change that is dependent upon the thickness and rate at which a metallic deposit is deposited onto the cap 13.

The details of the eddy current sensor unit 11 and the associated detector driver unit 17 are not shown, since they may take any number of forms well known in the art. One such type of eddy current sensor device is manufactured by the Bently-Nevada Corporation, and is a regular commercially available item.

The output of the detector driver unit 17 is supplied, for example, to the input of a conventional strip chart recorder 19 and may also be supplied, via an analog to digital converter 21, to the input of a microcomputer 23, the output of which is in turn connected to an output device 25, which may be, for example, a visual display, a recording device, or an output printer.

Referring to FIG. 2 of the drawings, the eddy current probe or sensor 11 comprises a body element of non-conductive material enclosing a coil which when energized will produce eddy currents in any metallic surface nearby, the effect of the eddy currents being determined by the detector driver unit 17 of FIG. 1. The sensor 11 is threaded for all or a greater portion of its length and is provided with a cap 13 of non-magnetic, non-conductive material having an internal thread which corresponds to the threads on the sensor 11. The lower wall of the cap 13 has a predetermined thickness designated by d of known and accurately measured amount. The cap 13 is screwed onto to the sensor 11, and the assembly is rendered liquid proof by any suitable means, such as a rubber enclosure or other arrangement to protect the assembly from liquid except for the lower wall.

When immersed in the plating path, after appropriate seeding, a plating deposit will take place on the outer portion of the lower wall, and this metallic deposit will be detected by the eddy current sensor, to provide an indication not only of the thickness of the plating but the rate at which it is occurring as shown on the strip chart recorder 19 or determined by the microcomputer 23.

FIG. 3 is a dimensionless graph showing the relationship between time, starting with the immersion of the sensor, and the eddy current loss as measured by the sensing device. The initial portion of the curve, designated as "seeding effectiveness," indicates the time from the immersion of the probe to the time, at 15, when plating commences. This time appears to be an indicator of (1) seeding effectiveness (using different methods), and (2) plating bath solution activity (varying chemical parameters). Suitable characterization or standardization of either of these factors will enable study of the variation of the other factor. The portion of the curve which rises from 15 to a peak value at 17, is the segment used for measurement of initiation of the plating operation. It can be seen that a high resolution is obtained with this curve and the rate, of course, is proportional to the slope of the curve. The central portion of the curve is the section which is used for thickness measurement of coatings after a plating operation has taken place, while the very right hand portion with substantially zero slope is commonly used for displacement measurements with eddy current sensors by using thick conductive targets and a varying airgap.

FIG. 4 shows the use of the invention with a conventional vacuum deposition system. A vacuum chamber 19 contains a source 21 of metallic vapor or particles, which are directed to an object 23 on which a metal layer is to be deposited. The sensor 11, 13 is inserted in the chamber as shown, and metal is also deposited on the sensor. The remainder of the apparatus, its operation and characteristics are similar to those described above.

From the foregoing it will be apparent that the present invention provides an improved method and apparatus for determining the thickness of plating being provided in an electroless plating bath as well as the rate of deposition.

While the invention has been particularly shown and described with reference to a preferred embodiment thereof, it will be understood by those skilled in the art that various changes in form and details may be made therein without departing from the spirit and scope of the invention.

We claim:

1. The method of measuring the rate of initiation of a plating operation in an electroless plating bath by the steps of:
   positioning an eddy current detector at a predetermined distance of a test surface where electroless plating is taking place;
   monitoring the output of the eddy current detector; and
   determining the rate of change of said output during the initiation phase of said plating operation whereby said rate of change is indicative of the rate of initiation of said plating operation.

2. The method of determining the seeding effectiveness of an electroless plating bath by the steps of:
   positioning the eddy current detector at a predetermined distance of a test surface where deposition is taking place;
   immersing said eddy current detector and said test surface in said plating bath; and
   measuring the time from the immersion of the probe to the initiation of plating whereby said time is indicative of the seeding effectiveness of said electroless plating bath.

3. An improved method for monitoring the thickness of deposition in a metallic deposition environment comprising the steps of:
   positioning an eddy current detector at a predetermined distance of a test surface in a wet electroless plating bath where the deposition is taking place;
   measuring the output of the eddy current detector from the time of the immersion of the probe in the wet electroless plating bath to the time when plating commences whereby said time is indicative of the seeding effectiveness of said electroless plating bath; and
   measuring the output of the eddy current detector during the initiation of the plating operation.

4. A method of monitoring the real time deposition rate of a metallic deposition process by the steps of:
   utilizing an eddy current sensor;
   connecting measuring means to the output of the eddy current sensor;
   positioning the eddy current sensor at a predetermined distance of a test surface in a wet electroless plating bath where the deposition is taking place;
   monitoring the output of the sensor with respect to the amplitude and the rate of change of the output;
   recording the output curve of the sensor;
   determining the seeding effectiveness and the plating bath solution activity from the initial portion of the output curve which indicates the time from the immersion of the sensor to a time when plating commences;
   determining the initiation of the plating operation from the steep portion of the curve;
   determining the thickness of the plating after a plating operation has taken place from the central portion of the curve; and
   determining displacement measurements from the final portion of the curve.

* * * * *